United States Patent
Muto (10) Patent No.: US 9,727,125 B2
(45) Date of Patent: Aug. 8, 2017

(54) POWER SUPPLY SYSTEM WITH A PLURALITY OF POWER SUPPLY CIRCUITS AND CONTROL METHOD OF THE SAME

(71) Applicant: Jun Muto, Toyota (JP)

(72) Inventor: Jun Muto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 692 days.

(21) Appl. No.: 14/177,504

(22) Filed: Feb. 11, 2014

(65) Prior Publication Data

US 2014/0237280 A1    Aug. 21, 2014

(30) Foreign Application Priority Data

Feb. 18, 2013  (JP) .................................. 2013-029469

(51) Int. Cl.
| | | |
|---|---|---|
| G06F 1/32 | (2006.01) | |
| H02M 3/28 | (2006.01) | |
| H02M 3/158 | (2006.01) | |
| H02M 3/335 | (2006.01) | |
| H02M 1/00 | (2006.01) | |

(52) U.S. Cl.
CPC .......... *G06F 1/3293* (2013.01); *H02M 3/285* (2013.01); *H02M 3/33561* (2013.01); *H02M 3/1584* (2013.01); *H02M 3/3353* (2013.01); *H02M 3/33584* (2013.01); *H02M 2001/0025* (2013.01); *H02M 2001/0064* (2013.01)

(58) Field of Classification Search
CPC ....... H02M 3/285; H02M 3/1584; H02J 1/102
See application file for complete search history.

(56) References Cited

U.S. PATENT DOCUMENTS

| | | | | |
|---|---|---|---|---|
| 6,674,274 | B2 * | 1/2004 | Hobrecht | H02J 1/102 323/268 |
| 2008/0129259 | A1 | 6/2008 | Endo et al. | |
| 2011/0198933 | A1 | 8/2011 | Ishigaki et al. | |
| 2012/0074949 | A1 * | 3/2012 | Kepley | H02M 3/33584 324/426 |
| 2012/0326681 | A1 * | 12/2012 | Shono | H02M 3/1584 323/271 |
| 2013/0099559 | A1 * | 4/2013 | Machi | H02M 3/335 307/9.1 |
| 2013/0272032 | A1 * | 10/2013 | Mueller | H02M 3/3387 363/17 |

FOREIGN PATENT DOCUMENTS

| | | |
|---|---|---|
| JP | 10243637 A | 9/1998 |
| JP | 2000278949 A | 10/2000 |
| JP | 2001-209437 A | 8/2001 |
| JP | 2007336764 A | 12/2007 |
| JP | 2008141802 A | 6/2008 |
| JP | 2011-193713 A | 9/2011 |

\* cited by examiner

*Primary Examiner* — Rexford Barnie
*Assistant Examiner* — David Shiao
(74) *Attorney, Agent, or Firm* — Sughrue Mion, PLLC (57) ABSTRACT

A power supply system includes a plurality of power supply circuits connected to a common output node and a control unit that controls outputs of the plurality of power supply circuits such that an output value at the output node follows an output target value at the output node. The control unit is configured to change the output of part of the plurality of power supply circuits when there is a deviation smaller than or equal to a predetermined value between the output value and the output target value.

14 Claims, 7 Drawing Sheets

POWER SUPPLY SYSTEM WITH A PLURALITY OF POWER SUPPLY CIRCUITS AND CONTROL METHOD OF THE SAME

INCORPORATION BY REFERENCE

The disclosure of Japanese Patent Application No. 2013-029469 filed on Feb. 18, 2013 including the specification, drawings and abstract is incorporated herein by reference in its entirety.

BACKGROUND OF THE INVENTION

1. Field of the Invention

The invention relates to a technique for controlling outputs of a plurality of power supply circuits connected to a common output node.

2. Description of Related Art

For example, Japanese Patent Application Publication No. 2001-209437 (JP 2001-209437 A) is known as a technique for controlling outputs of a plurality of power supply circuits connected to a common output node. A power supply system described in JP 2001-209437 A adjusts output voltages by comparing an output current of one of the power supply circuits with an output current of the other one of the power supply circuits in order to equalize voltage values that are supplied from the power supply circuits to a load when the plurality of power supply circuits are operated in parallel with each other.

SUMMARY OF THE INVENTION

The invention provides a power supply system that causes an output value to highly accurately follow an output target value.

A first aspect of the invention provides a power supply system. The power supply system includes a plurality of power supply circuits connected to a common output node and a control unit configured to control outputs of the plurality of power supply circuits such that an output value at the output node follows an output target value at the output node. The control unit is configured to change the output of part of the plurality of power supply circuits when there is a deviation smaller than or equal to a predetermined value between the output value and the output target value.

A second aspect of the invention provides a control method for controlling outputs of a plurality of power supply circuits such that an output value at a common output node to which the plurality of power supply circuits are connected follows an output target value at the output node. The control method includes changing the output of part of the plurality of power supply circuits when there is a deviation smaller than or equal to a predetermined value between the output value and the output target value.

According to the aspects of the invention, it is possible to cause the output value to highly accurately follow the output target value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Electric Power Conversion System 100

Figure 1:
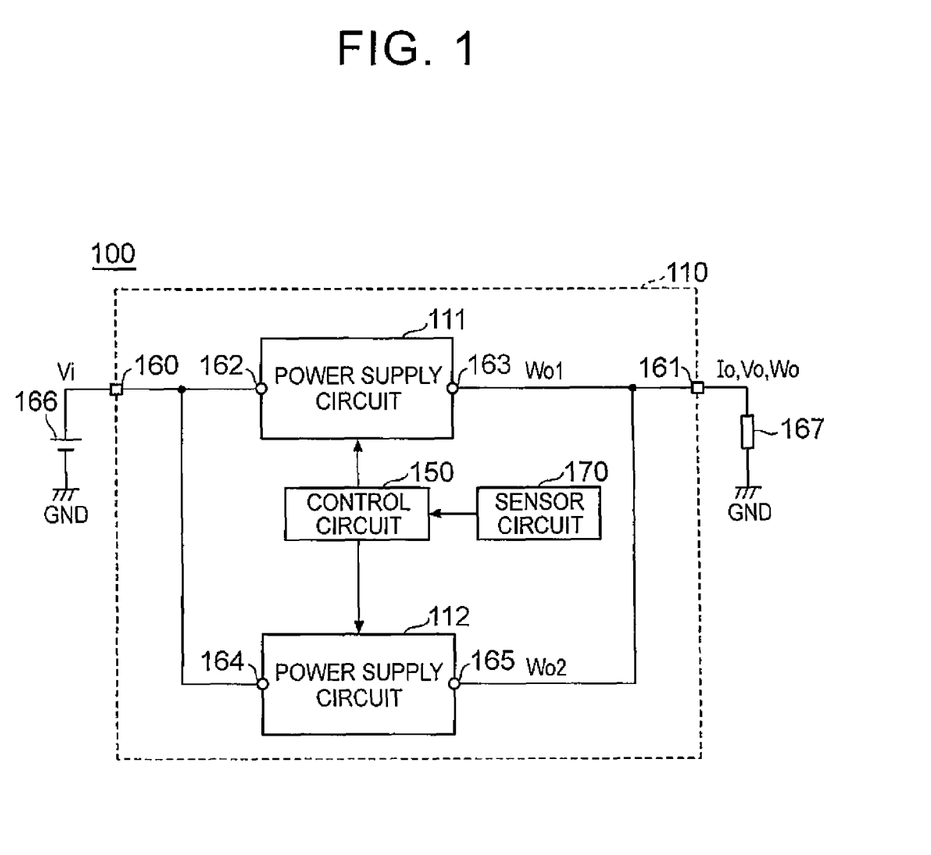
FIG. 1 is a block diagram that shows a configuration example of a power supply system according to a first embodiment of the invention.

FIG. 1 is a view that shows the configuration of an electric power conversion system 100 including an electric power conversion circuit 110 that is a first embodiment of the power supply system according to the invention. The electric power conversion system 100 is, for example, an electric power conversion system configured to include power supply circuits 111, 112, a control circuit 150 and a sensor circuit 170.

The electric power conversion system 100 is, for example, configured to include a power supply 166 and a load 167. The power supply 166 is connected to an input terminal 160. The load 167 is connected to an output terminal 161. The power supply 166 is provided between the input terminal 160 and a ground. The load 167 is provided between the output terminal 161 and the ground.

The electric power conversion circuit 110 is a power supply system that includes the input terminal 160, the output terminal 161 and two power supply circuits 111, 112 and that has the function of converting electric power between the input terminal 160 and the output terminal 161 with the use of the power supply circuits 111, 112. The input terminal 160 is an input node common to the power supply circuits 111, 112 connected to the input terminal 160 in parallel with each other. The output terminal 161 is an output node common to the power supply circuits 111, 112 connected to the output terminal 161 in parallel with each other.

The electric power conversion circuit 110 steps up or steps down an input voltage Vi that is supplied from the power supply 166 via the input terminal 160, and applies an output voltage Vo, which is the converted voltage, to the load 167 via the output terminal 161. At this time, the electric power conversion circuit 110 supplies an output power Wo to the load 167 via the output terminal 161. In the output power Wo, a constant output voltage Vo is a direct-current voltage.

The electric power conversion circuit 110 is a DC-DC converter including the two power supply circuits 111, 112 connected in parallel with each other between the input terminal 160 and the output terminal 161. By redundantly including a plurality of power supply circuits in this way, it is possible to increase the output power Wo allowed to be supplied to the load 167 or improve fail-safe performance at the time when part of the plurality of power supply circuits has a failure.

The power supply circuit 111 is a DC-DC converter circuit that includes an input port 162 connected to the input terminal 160 and an output port 163 connected to the output terminal 161 and that has the function of converting electric power between the input port 162 and the output port 163. The power supply circuit 111 steps up or steps down the input voltage Vi that is input from the input port 162 and outputs an output power Wo1 from the output port 163. In the output power Wo1, the output voltage Vo, which is the converted voltage, is a direct-current voltage. Similarly, the power supply circuit 112 is a DC-DC converter circuit that includes an input port 164 connected to the input terminal 160 and an output port 165 connected to the output terminal 161 and that has the function of converting electric power between the input port 164 and the output port 165. The power supply circuit 112 steps up or steps down the input voltage Vi that is input from the input port 164 and outputs an output power Wo2 from the output port 165. In the output power Wo2, the output voltage Vo, which is the converted voltage, is a direct-current voltage. The output power Wo is the sum of the output power Wo1 and the output power Wo2.

The power supply circuits 111, 112 each desirably include the electric power conversion circuit having the same circuit configuration; however, the power supply circuits 111, 112 may have different circuit configurations. A specific example of each of the power supply circuits 111, 112 is a switching power supply circuit; however, it may be a power supply circuit having another electric power conversion mode.

The electric power conversion circuit 110 includes the sensor circuit 170. The sensor circuit 170 is a sensor unit that detects an output value Do at the output terminal 161 at intervals of a predetermined detection period and that outputs a detection signal corresponding to the output value Do to the control circuit 150. The output value Do may be, for example, the voltage value at the output voltage Vo that is output from the output terminal 161, the current value of the output current Io flowing through the output terminal 161 and the power value of the output power Wo that is output from the output terminal 161.

The sensor circuit 170 is, for example, a detection circuit that detects the voltage value of the output voltage Vo that is output from the output terminal 161 and that outputs a detection signal corresponding to the voltage value of the output voltage Vo. However, the sensor circuit 170 may be a detection circuit that detects the current value of the output current Io flowing through the output terminal 161 and that outputs a detection signal corresponding to the current value of the output current Io. Alternatively, the sensor circuit 170 may be a detection circuit that detects the power value of the output power Wo that is output from the output terminal 161 and that outputs a detection signal corresponding to the power value of the output power Wo.

The electric power conversion circuit 110 includes the control circuit 150. The control circuit 150 is a control unit that controls the outputs of the power supply circuits 111, 112 such that the output value Do at the output terminal 161 follows an output target value Dot at the output terminal 161. The control circuit 150 is, for example, an electronic circuit including a microcomputer that incorporates a CPU. The output target value Dot is a command value from a predetermined device. The output target value Dot may be an output target voltage value Vot, an output target current value Iot or an output target power value Wot.

The control circuit 150, for example, feeds back the output value Do detected by the sensor circuit 170, and controls the respective output powers of the power supply circuits 111, 112 such that the difference between the output target value Dot and the fed-back detected output value Do becomes zero. The control circuit 150 may be a circuit that controls the respective output voltages of the power supply circuits 111, 112 or may be a circuit that controls the respective output currents of the power supply circuits 111, 112.

The control circuit 150, for example, changes the values of control parameters P with which the respective output powers of the power supply circuits 111, 112 can be controlled by converting electric power. The power supply circuit 111 controls the magnitude (power value) of the output power Wo1 on the basis of the value of a control parameter P1 determined by the control circuit 150 in accordance with the output value Do and the output target value Dot. The control parameter P1 is a control variable with which the electric power conversion operation of the electric power conversion circuit configured in the power supply circuit 111 is controlled. Similarly, the power supply circuit 112 controls the magnitude (power value) of the output power Wo2 on the basis of the value of a control parameter P2 determined by the control circuit 150 in accordance with the output value Do and the output target value Dot. The control parameter P2 is a control variable with which the electric power conversion operation of the electric power conversion circuit configured in the power supply circuit 112 is controlled.

When there is a deviation (in other words, difference) over a predetermined value X1 (>0) between the output value Do and the output target value Dot due to fluctuations in the output target value Dot, the control circuit 150 changes all the outputs of the plurality of power supply circuits such that the output value Do follows the output target value Dot. For example, in the case of FIG. 1, the control circuit 150 changes both the outputs of the power supply circuits 111, 112.

On the other hand, when there is a deviation smaller than or equal to the predetermined value X1 between the output value Do and the output target value Dot due to fluctuations in the output target value Dot, the control circuit 150 changes the output of only part of the plurality of power supply circuits such that the output value Do follows the output target value Dot. At this time, when the control circuit 150 has changed the output of only the part of the power supply circuits, the control circuit 150 does not change the output of the remaining power supply circuit, other than the part of the power supply circuits, among the plurality of power supply circuits. For example, in the case of FIG. 1, the control circuit 150 changes the output of only one of the power supply circuits 111, 112 and does not change the output of the other one of the power supply circuits 111, 112.

When there is the deviation smaller than or equal to the predetermined value X1 between the output value Do and the output target value Dot, not both the output powers Wo1, Wo2 are changed at the same time but only one of the output powers Wo1, Wo2 is changed. Thus, it is possible to temporarily reduce the control resolution (the span of adjustable range) of the output value Do as compared to when both the output powers Wo1, Wo2 are changed at the same time. As a result, it is possible to cause the output value Do to highly accurately follow the output target value Dot.

On the other hand, when there is the deviation over the predetermined value X1 between the output value Do and the output target value Dot, all the outputs of the plurality of power supply circuits are changed. Therefore, it is possible to suppress a reduction of the gain of the output value Do (deterioration of the response of the output value Do).

The predetermined value X1 should be, for example, set to a minimum variation amount of the output value Do at the time when the outputs of all the plurality of power supply circuits have been changed at the same time. Specifically, the predetermined value X1 should be set to a variation amount of the output value Do at the time when the control parameters P, with which the outputs of the plurality of power supply circuits can be controlled, have been changed by the minimum control resolution amounts of the respective outputs. By setting the predetermined value X1 in this way, it is possible to cause the output value Do to further highly accurately follow the output target value Dot.

Operation of Electric Power Conversion Circuit 110

Figure 2:
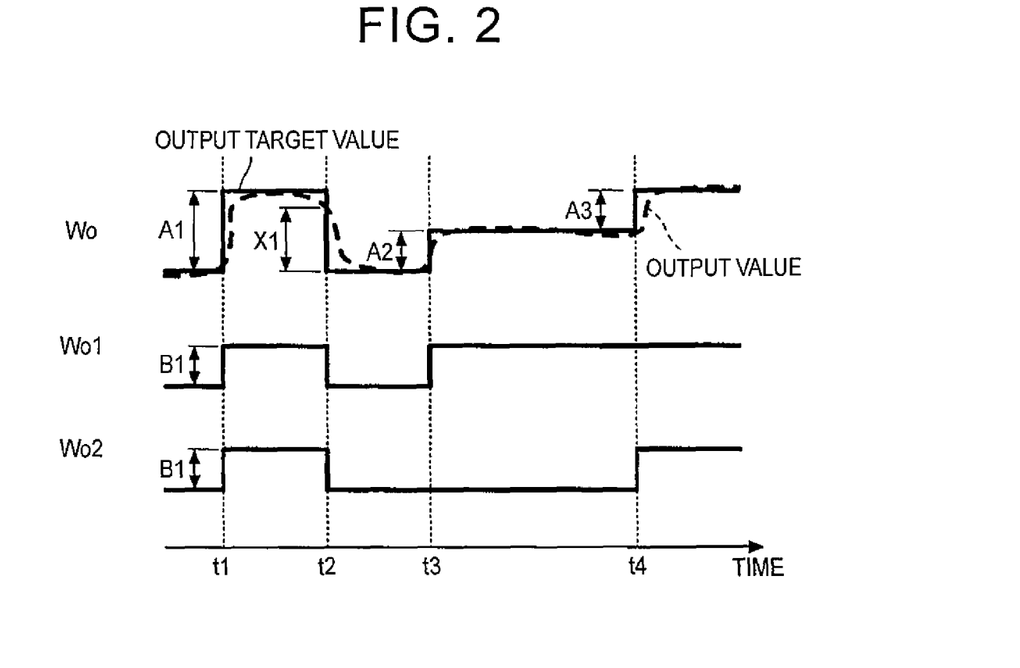
FIG. 2 is a timing chart in the case where one of outputs of power supply circuits is changed according to the first embodiment.

FIG. 2 is a timing chart that shows an example of the operation of the electric power conversion circuit 110 shown in FIG. 1. FIG. 2 shows a state where the control circuit 150 of the electric power conversion circuit 110 controls the magnitude of the output power Wo1 of the power supply circuit 111 and the magnitude of the output power Wo2 of the power supply circuit 112 such that the output value Do at the output terminal 161 follows the output target value Dot. Here, the output target value Dot is an output power target value Wot. The control circuit 150 controls the magnitude of the output power Wo1 and the magnitude of the output power Wo2 by changing the values of the control parameters P1, P2 of the power supply circuits 111, 112.

A variation amount B1 is a minimum control resolution (span of adjustable range) of the output value of one power supply circuit and is, specifically, a variation amount of the output of one power supply circuit at the time when the control parameter P with which the output can be controlled has been changed by the minimum control resolution amount of the output.

When there is a deviation A1 over the predetermined value X1 between the power value of the output power Wo and the output target power value Wot at timing t1 due to an increase in the output target power value Wot, the control circuit 150 changes the values of the control parameters P1, P2 such that the output powers Wo1, Wo2 increase. The control circuit 150 keeps the values of the control parameters P1, P2 until the next timing t2 at which a change of the output target power value Wot is detected. Thus, the increased magnitudes of the output powers Wo1, Wo2 are kept.

Similarly, when there is the deviation A1 over the predetermined value X1 between the power value of the output power Wo and the output target power value Wot at the timing t2 due to a reduction in the output target power value Wot, the control circuit 150 changes the values of the control parameters P1, P2 such that the output powers Wo1, Wo2 decrease. The control circuit 150 keeps the values of the control parameters P1, P2 until the next timing t3 at which a change of the output target power value Wot is detected. Thus, the decreased magnitudes of the output powers Wo1, Wo2 are kept.

On the other hand, when there is a deviation A2 smaller than or equal to the predetermined value X1 between the power value of the output power Wo and the output target power value Wot at the timing t3 due to an increase in the output target power value Wot, the control circuit 150 changes the value of only the control parameter P1 such that only the output power Wo1 increases. The control circuit 150 keeps the values of the control parameters P1, P2 until the next timing t4 at which a change of the output target power value Wot is detected. Thus, the increased magnitude of the output power Wo1 is kept, and the magnitude of the output power Wo2 is kept unchanged.

Similarly, when there is a deviation A3 smaller than or equal to the predetermined value X1 between the power value of the output power Wo and the output target power value Wot at the timing t4 due to an increase in the output target power value Wot, the control circuit 150 changes the value of only the control parameter P2 such that only the output power Wo2 increases. The control circuit 150 fixes the values of the control parameters P1, P2 until the next timing at which a change of the output target power value Wot is detected. Thus, the magnitude of the output power Wo1 is kept unchanged, and the increased magnitude of the output power Wo2 is kept.

In this way, when there is the deviation smaller than or equal to the predetermined value X1 between the power value of the output power Wo and the output target power value Wot, it is possible to temporarily reduce the control resolution of the output power Wo by not changing both the output powers Wo1, Wo2 at the same time but changing only one of the output powers Wo1, Wo2. As a result, the trackability of the output power Wo to the output target power value Wot improves.

Figure 3:
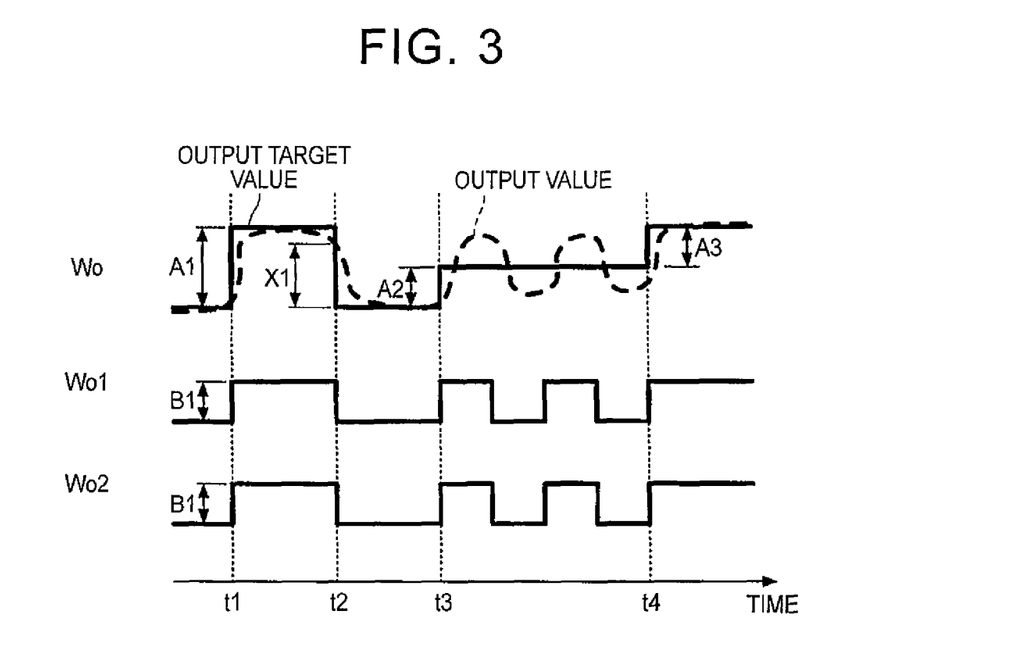
FIG. 3 is a timing chart in the case where both outputs of the power supply circuits are constantly changed according to the first embodiment.

In contrast to this, as shown in FIG. 3, even in the case where there is the deviation A2 smaller than or equal to the predetermined value X1 between the power value of the output power Wo and the output target power value Wot, but when both the output powers Wo1, Wo2 are changed, the control resolution of the output power Wo increases. Therefore, the ripple of the output power Wo increases, and an overshoot and an undershoot are repeated little by little with respect to the output target power value, so the trackability of the output power Wo to the output target power value Wot decreases.

Incidentally, in the case where the control circuit 150 has changed the output of only part of the power supply circuits, when the output target value Dot has further changed in the same direction as the direction in which the output of only the part of the power supply circuits has changed, the output of the power supply circuit other than the part of the power supply circuits may be changed. This prevents an excessive deviation between the output value of the part of the power supply circuits and the output value of the other power supply circuit, so it is possible to suppress a decrease in the efficiency of electric power conversion of the overall electric power conversion circuit 110 due to an excessive deviation between both the output values. In addition, at this time, the control circuit 150 may set both the output of the part of the power supply circuits and the output of the other power supply circuit such that the output difference therebetween falls within a predetermined range. This further effectively prevents an excessive deviation between the output value of the part of the power supply circuits and the output value of the other power supply circuit.

The condition that "the output difference falls within the predetermined range" may include a condition that "the output difference is zero".

For example, in FIG. 2, when the output target power value Wot has further increased at the timing t4 after only the output power Wo1 has been increased at the timing t3, the control circuit 150 increases only the output power Wo2. At this time, the control circuit 150 sets both the output power Wo1 and the output power Wo2 such that the difference between the output power Wo1 and the output power Wo2 is zero. This effectively prevents an excessive deviation between the respective magnitudes of the output powers Wo1, Wo2.

On the other hand, when the output target value Dot has further changed in the direction opposite to the direction in which the output of only the part of the power supply circuits has changed after the output of only part of the power supply circuits has been changed, the control circuit 150 may change the output of the part of the power supply circuits. This prevents an excessive deviation between the output value of the part of the power supply circuits and the output value of the other power supply circuit, so it is possible to suppress a decrease in the efficiency of electric power conversion of the overall electric power conversion circuit 110 due to an excessive deviation between both the output values. In addition, at this time, the control circuit 150 may set both the output of the part of the power supply circuits and the output of the other power supply circuit such that the output difference falls within a predetermined range. This further effectively prevents an excessive deviation between the output value of the part of the power supply circuits and the output value of the other power supply circuit.

In this case as well, the condition that "the output difference falls within the predetermined range" may include a condition that "the output difference is zero".

For example, when the output target power value Wot has decreased (opposite to the case of FIG. 2) at the timing t4 after only the output power Wo1 has been increased at the timing t3, the control circuit 150 decreases only the output power Wo1. At this time, the control circuit 150 sets both the output power Wo1 and the output power Wo2 such that the difference between the output power Wo1 and the output power Wo2 is zero. This effectively prevents an excessive deviation between the respective magnitudes of the output powers Wo1, Wo2.

FIG. 2 shows the case where the output powers are controlled; however, the same applies to the case where the output voltages or the output currents are controlled.

Configuration of Electric Power Conversion System 101

Figure 4:
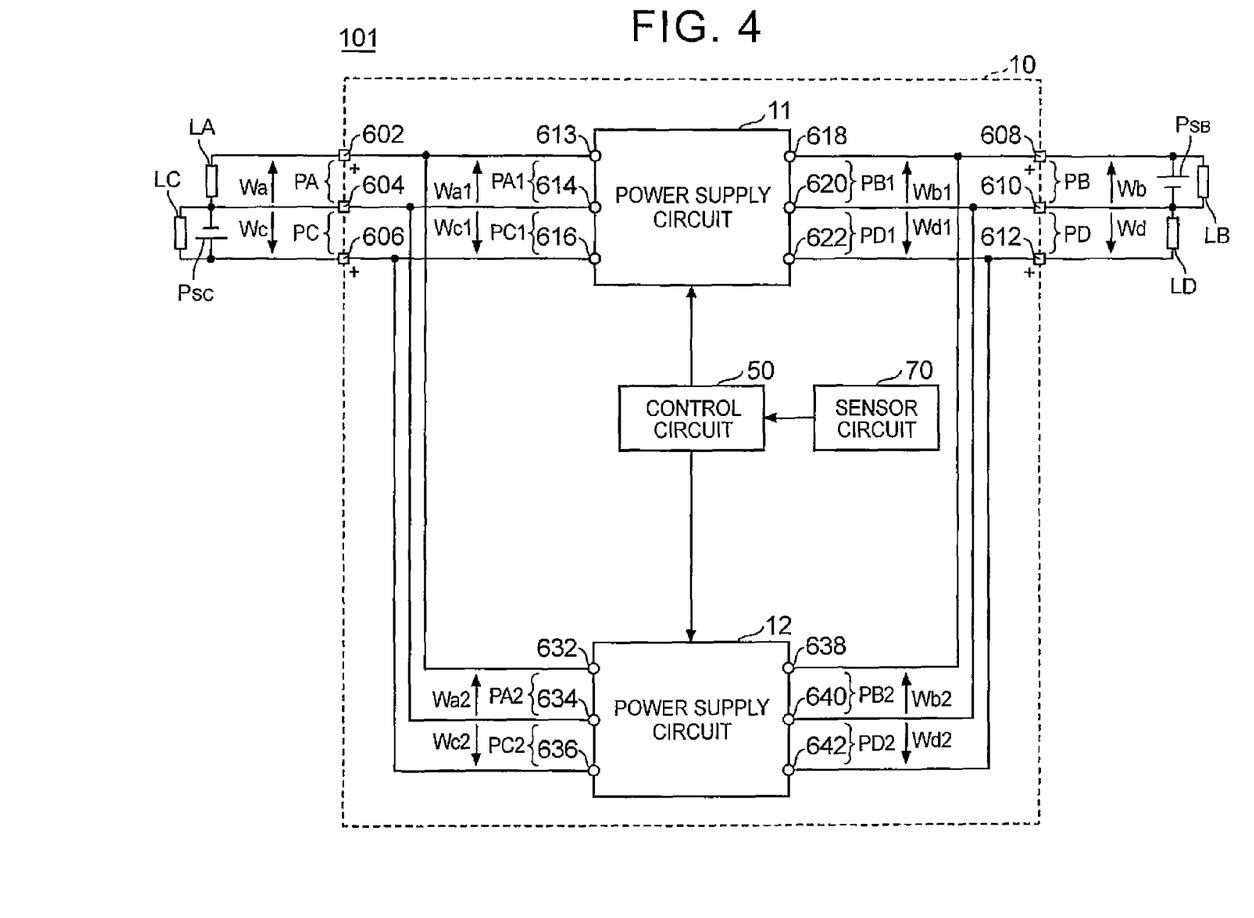
FIG. 4 is a block diagram that shows a configuration example of a power supply system according to a second embodiment of the invention.

FIG. 4 is a view that shows an electric power conversion system 101 including an electric power conversion circuit 10 that is a second embodiment of the power supply system according to the invention. The description of similar components and advantageous effects to those of the above-described embodiment is omitted. The electric power conversion system 101 is an electric power conversion system configured to include the electric power conversion circuit 10, a control circuit 50 and a sensor circuit 70.

The electric power conversion system 101 is, for example, configured to include a primary high voltage system load LA, a primary low voltage system load LC and a primary low voltage system power supply PSC. The primary high voltage system load LA is connected to a first input/output port PA. The primary low voltage system load LC and the primary low voltage system power supply PSC are connected to a second input/output port PC. The primary low voltage system power supply PSC supplies electric power to the primary low voltage system load LC that operates at the same voltage system (for example, 12 V system) as the primary low voltage system power supply PSC. In addition, the primary low voltage system power supply PSC supplies electric power, stepped up by a primary full-bridge circuit, to the primary high voltage system load LA that operates at the voltage system (for example, 48 V system higher than 12 V system) different from that of the primary low voltage system power supply PSC. A specific example of the primary low voltage system power supply PSC is a secondary battery, such as a lead-acid battery.

The electric power conversion system 101 is, for example, configured to include a secondary high voltage system load LB, a secondary high voltage system power supply PSB and a secondary low voltage system load LD. The secondary high voltage system load LB and the secondary high voltage system power supply PSB are connected to the third input/output port PB. The secondary low voltage system load LD is connected to the fourth input/output port PD. The secondary high voltage system power supply PSB supplies electric power to the secondary high voltage system load LB that operates at the same voltage system (for example, 288V system higher than 12 V system or 48 V system) as the secondary high voltage system power supply PSB. In addition, the secondary high voltage system power supply PSB supplies electric power, stepped down by a secondary full-bridge circuit, to the secondary low voltage system load LD that operates at the voltage system (for example, 72 V system lower than 288 V system) different from the secondary high voltage system power supply PSB. A specific example of the secondary high voltage system power supply PSB is a secondary battery, such as a lithium ion battery.

The electric power conversion circuit 10 is a power supply system that includes the above-described four input/output ports and that has the function of selecting any two input/output ports from among the four input/output ports and converting electric power between the selected two input/output ports with the use of the power supply circuits 11, 12. The first input/output port PA is an input/output node common to the power supply circuits 11, 12 connected to the first input/output port PA in parallel with each other, and is able to input or output electric power. This also applies to the above-described other three input/output ports.

Electric powers Wa, Wc, Wb, Wd are respectively input or output powers at the first input/output port PA, the second input/output port PC, the third input/output port PB and the fourth input/output port PD. Electric powers Wa1, Wc1, Wb1, Wd1 that are input or output in the power supply circuit 11 are respectively an electric power at a first input/output port PA1 connected to the first input/output port PA, an electric power at a second input/output port PC1 connected to the second input/output port PC, an electric power at a third input/output port PB1 connected to the third input/output port PB, and an electric power at a fourth input/output port PD1 connected to the fourth input/output port PD. Similarly, electric powers Wa2, Wc2, Wb2, Wd2 that are input or output in the power supply circuit 12 are respectively electric powers at corresponding ports PA2, PC2, PB2, PD2.

Figure 5:
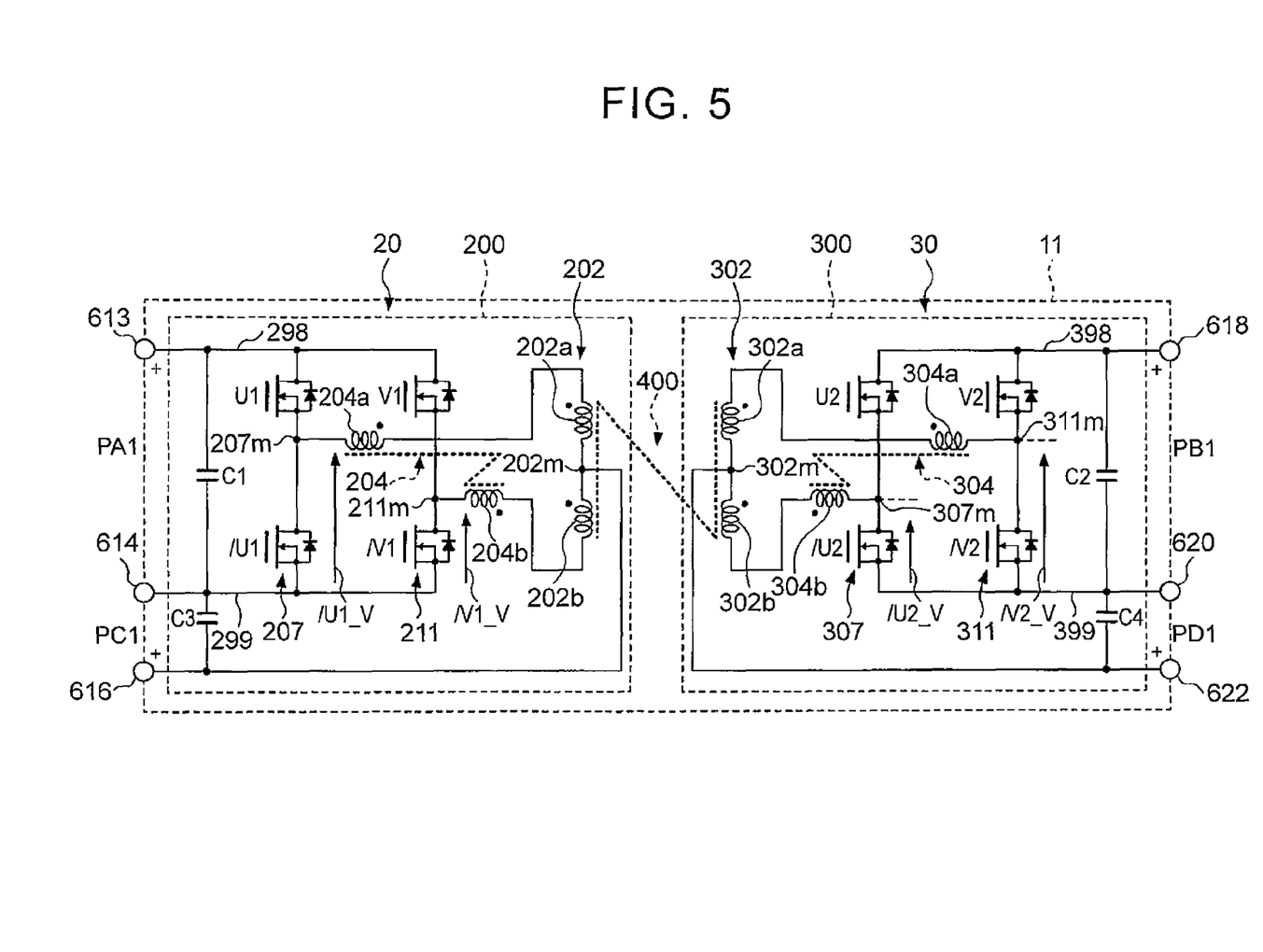
FIG. 5 is a circuit configuration diagram of one of power supply circuits according to the second embodiment.

FIG. 5 is a circuit configuration view of the power supply circuit 11. Next, the configuration of the power supply circuit 11 will be described additionally with reference to FIG. 4. The circuit configuration of the power supply circuit 12 may be the same as that of the power supply circuit 11, so the description thereof is omitted.

The power supply circuit 11 is configured to include a primary conversion circuit 20 and a secondary conversion circuit 30. The primary conversion circuit 20 and the secondary conversion circuit 30 are magnetically coupled to each other by a transformer 400 (center tap transformer).

The primary conversion circuit 20 is configured to include a primary full-bridge circuit 200, a first input/output port PA1 and a second input/output port PC1. The primary full-bridge circuit 200 is configured to include a primary coil 202 of the transformer 400, a primary magnetic coupling reactor 204, a primary first upper arm U1, a primary first lower arm /U1, a primary second upper arm V1 and a primary second lower arm /V1. Here, the primary first upper arm U1, the primary first lower arm /U1, the primary second upper arm V1 and the primary second lower arm /V1 each are, for example, a switching element configured to include an N-channel MOSFET and a body diode that is a parasitic element of the MOSFET. A diode may be additionally connected in parallel with the MOSFET.

The primary full-bridge circuit 200 includes a primary positive electrode bus 298 and a primary negative electrode bus 299. The primary positive electrode bus 298 is connected to a high-potential terminal 602 of the first input/output port PA and a high-potential terminal 613 of the first input/output port PA1. The primary negative electrode bus 299 is connected to a low-potential terminal 604 of the first input/output port PA and second input/output port PC and a low-potential terminal 614 of the first input/output port PA1 and second input/output port PC1.

A primary first arm circuit 207 is connected between the primary positive electrode bus 298 and the primary negative electrode bus 299. The primary first arm circuit 207 is formed by serially connecting the primary first upper arm U1 and the primary first lower arm /U1. The primary first arm circuit 207 is a primary first electric power conversion circuit portion that is able to carry out electric power conversion operation through on/off operation of each of the primary first upper arm U1 and the primary first lower arm /U1. Furthermore, a primary second arm circuit 211 is connected between the primary positive electrode bus 298 and the primary negative electrode bus 299 in parallel with the primary first arm circuit 207. The primary second arm circuit 211 is formed by serially connecting the primary second upper arm V1 and the primary second lower arm /V1. The primary second arm circuit 211 is a primary second electric power conversion circuit portion that is able to carry out electric power conversion operation through on/off operation of each of the primary second upper arm V1 and the primary second lower arm /V1.

The primary coil 202 and the primary magnetic coupling reactor 204 are provided at a bridge portion that connects a midpoint 207m of the primary first arm circuit 207 to a midpoint 211m of the primary second arm circuit 211. A connection relationship at the bridge portion will be described in more detail. One end of a primary first reactor 204a of the primary magnetic coupling reactor 204 is connected to the midpoint 207m of the primary first arm circuit 207. One end of the primary coil 202 is connected to the other end of the primary first reactor 204a. Furthermore, one end of a primary second reactor 204b of the primary magnetic coupling reactor 204 is connected to the other end of the primary coil 202. Moreover, the other end of the primary second reactor 204b is connected to the midpoint 211m of the primary second arm circuit 211. The primary magnetic coupling reactor 204 is configured to include the primary first reactor 204a and the primary second reactor 204b magnetically coupled to the primary first reactor 204a.

The midpoint 207m is a primary first intermediate node between the primary first upper arm U1 and the primary first lower arm /U1. The midpoint 211m is a primary second intermediate node between the primary second upper arm V1 and the primary second lower arm /V1. [0053] The first input/output ports PA, PA1 are ports provided between the primary positive electrode bus 298 and the primary negative electrode bus 299. The first input/output port PA is configured to include the terminal 602 and the terminal 604. The first input/output port PA1 is configured to include the terminal 613 and the terminal 614. The second input/output ports PC, PC1 are ports provided between the primary negative electrode bus 299 and a center tap 202m of the primary coil 202. The second input/output port PC is configured to include the terminal 604 and the terminal 606. The second input/output port PC1 is configured to include the terminal 614 and the terminal 616.

The center tap 202m is connected to the high-potential terminal 606 of the second input/output port PC and the high-potential terminal 616 of the second input/output port PC1. The center tap 202m is an intermediate connection point between a primary first winding 202a and a primary second winding 202b that constitute the primary coil 202.

The secondary conversion circuit 30 is a secondary circuit configured to include the secondary full-bridge circuit 300, the third input/output port PB1 and the fourth input/output port PD1. The secondary full-bridge circuit 300 is a secondary electric power conversion unit configured to include a secondary coil 302 of the transformer 400, a secondary magnetic coupling reactor 304, a secondary first upper arm U2, a secondary first lower arm /U2, a secondary second upper arm V2 and a secondary second lower arm /V2. Here, the secondary first upper arm U2, the secondary first lower arm /U2, the secondary second upper arm V2 and the secondary second lower arm /V2 each are, for example, a switching element configured to include an N-channel MOSFET and a body diode that is a parasitic element of the MOSFET. A diode may be additionally connected in parallel with the MOSFET.

The secondary full-bridge circuit 300 includes a secondary positive electrode bus 398 and a secondary negative electrode bus 399. The secondary positive electrode bus 398 is connected to a high-potential terminal 608 of the third input/output port PB and a high-potential terminal 618 of the third input/output port PB1. The secondary negative electrode bus 399 is connected to a low-potential terminal 610 of the third input/output port PB and fourth input/output port PD and a low-potential terminal 620 of the third input/output port PB1 and fourth input/output port PD1.

A secondary first arm circuit 307 is connected between the secondary positive electrode bus 398 and the secondary negative electrode bus 399. The secondary first arm circuit 307 is formed by serially connecting the secondary first upper arm U2 and the secondary first lower arm /U2. The secondary first arm circuit 307 is a secondary first electric power conversion circuit portion that is able to carry out electric power conversion operation through on/off operation of each of the secondary first upper arm U2 and the secondary first lower arm /U2. Furthermore, a secondary second arm circuit 311 is connected between the secondary positive electrode bus 398 and the secondary negative electrode bus 399 in parallel with the secondary first arm circuit 307. The secondary second arm circuit 311 is formed by serially connecting the secondary second upper arm V2 and the secondary second lower arm /V2. The secondary second arm circuit 311 is a secondary second electric power conversion circuit portion that is able to carry out electric power conversion operation through on/off operation of each of the secondary second upper arm V2 and the secondary second lower arm /V2.

The secondary coil 302 and the secondary magnetic coupling reactor 304 are provided at a bridge portion that connects a midpoint 307m of the secondary first arm circuit 307 to a midpoint 311m of the secondary second arm circuit 311. A connection relationship at the bridge portion will be described in more detail. One end of a secondary first reactor 304a of the secondary magnetic coupling reactor 304 is connected to the midpoint 311m of the secondary second arm circuit 311. One end of the secondary coil 302 is connected to the other end of the secondary first reactor 304a. Furthermore, one end of a secondary second reactor 304b of the secondary magnetic coupling reactor 304 is connected to the other end of the secondary coil 302. Moreover, the other end of the secondary second reactor 304b is connected to the midpoint 307m of the secondary first arm circuit 307. The secondary magnetic coupling reactor 304 is configured to include the secondary first reactor 304a and the secondary second reactor 304b magnetically coupled to the secondary first reactor 304a.

The midpoint 307m is a secondary first intermediate node between the secondary first upper arm U2 and the secondary first lower arm /U2. The midpoint 311m is a secondary second intermediate node between the secondary second upper arm V2 and the secondary second lower arm /V2.

The third input/output ports PB, PB1 are ports provided between the secondary positive electrode bus 398 and the secondary negative electrode bus 399. The third input/output port PB is configured to include the terminal 608 and the terminal 610. The third input/output port PB1 is configured to include the terminal 618 and the terminal 620. The fourth input/output ports PD, PD1 are ports provided between the secondary negative electrode bus 399 and a center tap 302m of the secondary coil 302. The fourth input/output port PD is configured to include the terminal 610 and the terminal 612. The fourth input/output port PD1 is configured to include the terminal 620 and the terminal 622.

The center tap 302m is connected to the high-potential terminal 612 of the fourth input/output port PD and the high-potential terminal 622 of the fourth input/output port PD1. The center tap 302m is an intermediate connection point between a secondary first winding 302a and a secondary second winding 302b that constitute the secondary coil 302.

In FIG. 4, the electric power conversion circuit 10 of the electric power conversion system 101 includes the sensor circuit 70. The sensor circuit 70 is a sensor unit that detects output values Do at the first to fourth input/output ports PA, PC, PB, PD at intervals of a predetermined detection period and that outputs detection signals corresponding to the output values Do to the control circuit 50. The output values Do may be, for example, the power values of the electric powers Wa, Wc, Wb, Wd, output voltage values or output current values at the first to fourth input/output ports PA, PC, PB, PD. In addition, the sensor circuit 70 may monitor the voltages at the midpoints 207m, 211m, 307m, 311m.

The electric power conversion circuit 10 includes the control circuit 50. The control circuit 50 is a control unit that controls the outputs of the power supply circuits 11, 12 such that the output values Do at the first to fourth input/output ports PA, PC, PB, PD respectively follow the output target values Dot at the first to fourth input/output ports PA, PC, PB, PD. The control circuit 50 is, for example, an electronic circuit including a microcomputer that incorporates a CPU. The output target values Dot are command values from a predetermined device, and may be output target voltage values Vot, output target current values Iot or output target power values Wot.

The control circuit 50, for example, changes the values of the control parameters P with which the respective output powers of the power supply circuits 11, 12 can be controlled by converting electric power. In this case, the control parameters P are two types, that is, a phase difference φ and a duty ratio (on time δ). Although the details will be described later, the phase difference φ is a phase difference in switching timing between the primary full-bridge circuit 200 and the secondary full-bridge circuit 300, and the duty ratio (on time δ) is a duty ratio (on time) of each of pulse signals formed of those switching timings. These two types of control parameters P can be controlled independently of each other. The control circuit 50 changes the outputs of the power supply circuits 11, 12 through duty ratio control and/or phase control over the primary full-bridge circuit 200 and the secondary full-bridge circuit 300 by using the phase difference φ and the duty ratio (on time δ).

Figure 6:
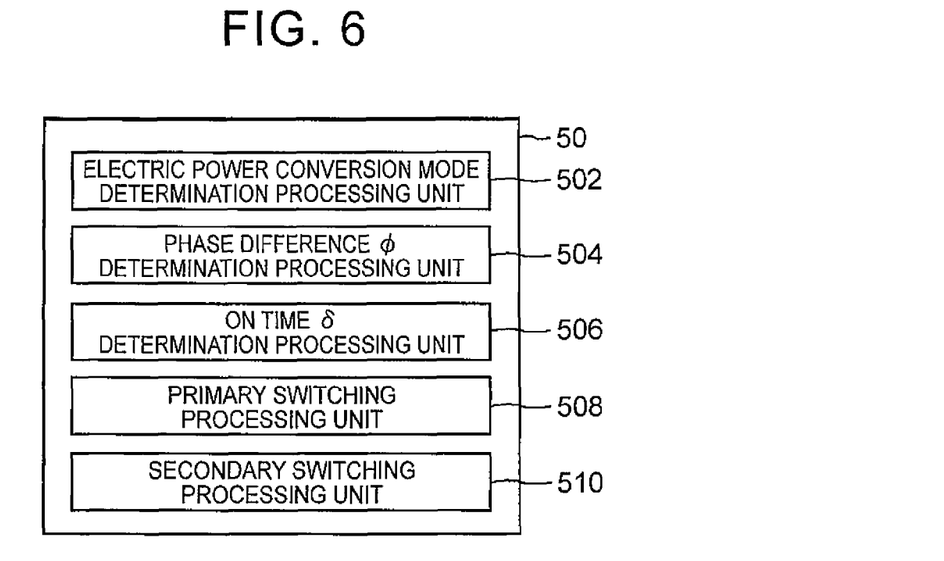
FIG. 6 is a block diagram of a control unit according to the second embodiment.

FIG. 6 is a block diagram of the control circuit 50. The control circuit 50 is a control unit that has the function of executing switching control over the switching elements, such as the primary first upper arm U1, of the primary conversion circuit 20 and the switching elements, such as the secondary first upper arm U2, of the secondary conversion circuit 30. The control circuit 50 is configured to include an electric power conversion mode determination processing unit 502, a phase difference φ determination processing unit 504, an on time δ determination processing unit 506, a primary switching processing unit 508 and a secondary switching processing unit 510. The control circuit 50 is, for example, an electronic circuit including a microcomputer that incorporates a CPU.

The electric power conversion mode determination processing unit 502 selects and determines an operation mode from among electric power conversion modes A to L of the electric power conversion circuit 10, described below, on the basis of an external signal (not shown). The electric power conversion modes include the mode A, the mode B and the mode C. In the mode A, electric power input from the first input/output port PA is converted and output to the second input/output port PC. In the mode B, electric power input from the first input/output port PA is converted and output to the third input/output port PB. In the mode C, electric power input from the first input/output port PA is converted and output to the fourth input/output port PD.

In addition, the electric power conversion modes further include the mode D, the mode E and the mode F. In the mode D, electric power input from the second input/output port PC is converted and output to the first input/output port PA. In the mode E, electric power input from the second input/output port PC is converted and output to the third input/output port PB. In the mode F, electric power input from the second input/output port PC is converted and output to the fourth input/output port PD.

The electric power conversion modes further include the mode G, the mode H and the mode I. In the mode G, electric power input from the third input/output port PB is converted and output to the first input/output port PA. In the mode H, electric power input from the third input/output port PB is converted and output to the second input/output port PC. In the mode I, electric power input from the third input/output port PB is converted and output to the fourth input/output port PD.

Moreover, the electric power conversion modes further include the mode J, the mode K and the mode L. In the mode J, electric power input from the fourth input/output port PD is converted and output to the first input/output port PA. In the mode K, electric power input from the fourth input/output port PD is converted and output to the second input/output port PC. In the mode L, electric power input from the fourth input/output port PD is converted and output to the third input/output port PB.

The phase difference φ determination processing unit 504 has the function of setting a phase difference φ in the switching period of the switching elements between the primary conversion circuit 20 and the secondary conversion circuit 30 in order to cause the electric power conversion circuit 10 to function as a DC-DC converter circuit.

The on time δ determination processing unit 506 has the function of setting an on time δ of each of the switching elements of the primary conversion circuit 20 and secondary conversion circuit 30 in order to cause each of the primary conversion circuit 20 and the secondary conversion circuit 30 to function as a step-up/step-down circuit.

The primary switching processing unit 508 has the function of executing switching control over the switching elements, that is, the primary first upper arm U1, the primary first lower arm /U1, the primary second upper arm V1 and the primary second lower arm /V1, on the basis of outputs of the electric power conversion mode determination processing unit 502, phase difference φ determination processing unit 504 and on time δ determination processing unit 506.

The secondary switching processing unit 510 has the function of executing switching control over the switching elements, that is, the secondary first upper arm U2, the secondary first lower arm /U2, the secondary second upper arm V2 and the secondary second lower arm /V2, on the basis of the outputs of the electric power conversion mode determination processing unit 502, phase difference φ determination processing unit 504 and on time δ determination processing unit 506.

Operation of Electric Power Conversion System 101

The operation of the electric power conversion system 101 will be described with reference to FIG. 4 to FIG. 6. For example, when an external signal that requires the electric power conversion circuit 10 to operate in the mode F is input, the electric power conversion mode determination processing unit 502 of the control circuit 50 determines the electric power conversion mode of the electric power conversion circuit 10 as the mode F. At this time, the voltage input to the second input/output port PC1 is stepped up by the step-up function of the primary conversion circuit 20, the stepped-up voltage is transferred to the third input/output port PB1 side by the function of the electric power conversion circuit 10 as the DC-DC converter circuit and is further stepped down by the step-down function of the secondary conversion circuit 30, and the resultant voltage is output from the fourth input/output port PD1.

Here, the details of the step-up/step-down function of the primary conversion circuit 20 will be described. Focusing on the second input/output port PC1 and the first input/output port PA1, the terminal 616 of the second input/output port PC1 is connected to the midpoint 207m of the primary first arm circuit 207 via the primary first winding 202a and the primary first reactor 204a serially connected to the primary first winding 202a. Both ends of the primary first arm circuit 207 are connected to the first input/output port PA1, with the result that a step-up/step-down circuit is connected between the terminal 616 of the second input/output port PC1 and the first input/output port PA1.

Furthermore, the terminal 616 of the second input/output port PC1 is connected to the midpoint 211m of the primary second arm circuit 211 via the primary second winding 202b and the primary second reactor 204b serially connected to the primary second winding 202b. Both ends of the primary second arm circuit 211 are connected to the first input/output port PA1, with the result that a step-up/step-down circuit is connected in parallel between the terminal 616 of the second input/output port PC1 and the first input/output port PA1. The secondary conversion circuit 30 is a circuit having a substantially similar configuration to that of the primary conversion circuit 20, with the result that two step-up/step-down circuits are connected in parallel with each other between the terminal 622 of the fourth input/output port PD1 and the third input/output port PB1. Thus, the secondary conversion circuit 30 has a similar step-up/step-down function to that of the primary conversion circuit 20.

Next, the function of the power supply circuit 11 as the DC-DC converter circuit will be described in detail. Focusing on the first input/output port PA1 and the third input/output port PB1, the primary full-bridge circuit 200 is connected to the first input/output port PA1, and the secondary full-bridge circuit 300 is connected to the third input/output port PB1. The primary coil 202 provided at the bridge portion of the primary full-bridge circuit 200 and the secondary coil 302 provided at the bridge portion of the secondary full-bridge circuit 300 are magnetically coupled to each other, thus functioning as the transformer 400 (the center tap transformer having a winding number ratio of 1:N). Thus, by adjusting the phase difference between the switching period of the switching elements of the primary full-bridge circuit 200 and the switching period of the switching elements of the secondary full-bridge circuit 300, it is possible to convert electric power input to the first input/output port PA1 and transfer the electric power to the third input/output port PB1 or convert electric power input to the third input/output port PB1 and transfer the electric power to the first input/output port PA1.

Figure 7:
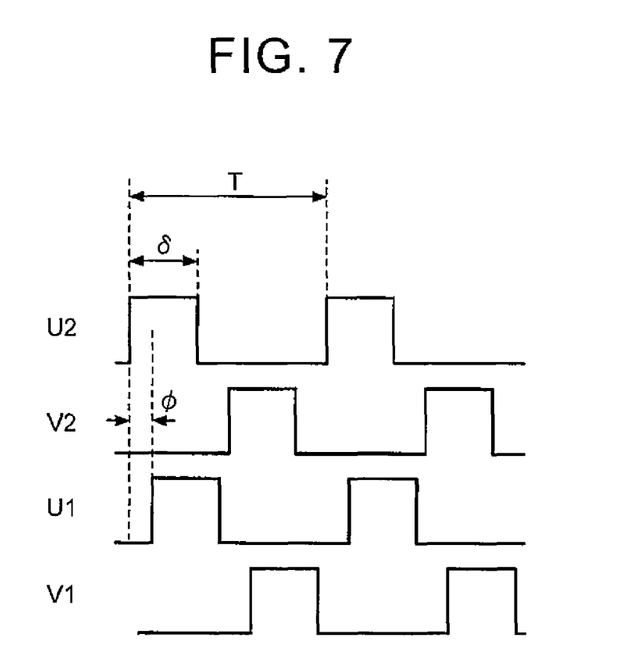
FIG. 7 is a timing chart that shows an operation example of the power supply system according to the second embodiment.

FIG. 7 is a view that shows a timing chart of the on/off state of each of the arms configured in the electric power conversion circuit 10 through control from the control circuit 50. In FIG. 7, U1 indicates an on/off waveform of the primary first upper arm U1, V1 indicates an on/off waveform of the primary second upper arm V1, U2 indicates an on/off waveform of the secondary first upper arm U2, and V2 indicates an on/off waveform of the secondary second upper arm V2. On/off waveforms of the primary first lower arm /U1, primary second lower arm /V1, secondary first lower arm /U2 and secondary second lower arm /V2 are respectively waveforms inverted from the on/off waveforms of the primary first upper arm U1, primary second upper arm V1, secondary first upper arm U2 and secondary second upper arm V2 (not shown). It is desirable that a dead time be provided between both on/off waveforms of each pair of upper and lower arms such that no flow-through current flows as a result of the on states of both upper and lower arms. In FIG. 7, the high level indicates the on state, and the low level indicates the off state.

Here, by changing the on time δ of each of U1, V1, U2, V2, it is possible to change a step-up/step-down ratio of the primary conversion circuit 20 and a step-up/step-down ratio of the secondary conversion circuit 30. For example, by equalizing the on time δ of each of U1, V1, U2, V2 to one another, it is possible to equalize the step-up/step-down ratio of the primary conversion circuit 20 to the step-up/step-down ratio of the secondary conversion circuit 30.

The on time δ determination processing unit 506 equalizes the on time δ of each of U1, V1, U2, V2 such that the step-up/step-down ratio of each of the primary conversion circuit 20 and the secondary conversion circuit 30 is equal to each other (each on time δ=primary on time δ1=secondary on time δ2=time value α).

The step-up/step-down ratio of the primary conversion circuit 20 depends on a duty ratio that is the ratio of the on time δ to a switching period T of each of the switching elements configured in the primary full-bridge circuit 200. Similarly, the step-up/step-down ratio of the secondary conversion circuit 30 depends on a duty ratio that is the ratio of the on time δ to a switching period T of each of the switching elements configured in the secondary full-bridge circuit 300. The step-up/step-down ratio of the primary conversion circuit 20 is a transformation ratio between the first input/output port PA1 and the second input/output port PC1. The step-up/step-down ratio of the secondary conversion circuit 30 is a transformation ratio between the third input/output port PB1 and the fourth input/output port PD1.

Thus, for example, the following mathematical expressions hold.

(Step-up/step-down ratio of the primary conversion circuit 20)=(Voltage of the second input/output port PC1)/(Voltage of the first input/output port PA1)=δ1/T=α/T (Step-up/step-down ratio of the secondary conversion circuit 30)=(Voltage of the fourth input/output port PD1)/(Voltage of the third input/output port PB1)=δ2/T=α/T That is, the step-up/step-down ratio of each of the primary conversion circuit 20 and the secondary conversion circuit 30 is a value (=α/T) equal to each other.

In FIG. 7, the on time δ denotes the on time δ1 of each of the primary first upper arm U1 and the primary second upper arm V1 and also denotes the on time δ2 of each of the secondary first upper arm U2 and the secondary second upper arm V2.

The phase difference between U1 and V1 is set to 180 degrees (π), and the phase difference between U2 and V2 is also set to 180 degrees (π). Furthermore, by changing the phase difference φ between U1 and U2, it is possible to adjust the amount of electric power transferred between the primary conversion circuit 20 and the secondary conversion circuit 30. When the phase difference φ is larger than 0, it is possible to transfer electric power from the primary conversion circuit 20 to the secondary conversion circuit 30; whereas, when the phase difference φ is smaller than 0, it is possible to transfer electric power from the secondary conversion circuit 30 to the primary conversion circuit 20.

Thus, for example, when an external signal that requires the electric power conversion circuit 10 to operate in the mode F is input, the electric power conversion mode determination processing unit 502 determines to select the mode F. The on time δ determination processing unit 506 sets the on time δ that prescribes the step-up ratio in the case where the primary conversion circuit 20 is caused to function as a step-up circuit that steps up voltage input to the second input/output port PC1 and outputs the stepped-up voltage to the first input/output port PA1. The secondary conversion circuit 30 functions as a step-down circuit that steps down voltage input to the third input/output port PB1 at the step-down ratio prescribed by the on time δ set by the on time δ determination processing unit 506 and outputs the stepped-down voltage to the fourth input/output port PD1. Furthermore, the phase difference φ determination processing unit 504 sets the phase difference φ for transferring electric power, input to the first input/output port PA1, to the third input/output port PB1 at a desired amount of electric power transferred.

The primary switching processing unit 508 executes switching control over the switching elements, that is, the primary first upper arm U1, the primary first lower arm /U1, the primary second upper arm V1 and the primary second lower arm /V1, such that the primary conversion circuit 20 is caused to function as the step-up circuit and the primary conversion circuit 20 is caused to function as part of the DC-DC converter circuit.

The secondary switching processing unit 510 executes switching control over the switching elements, that is, the secondary first upper arm U2, the secondary first lower arm /U2, the secondary second upper arm V2 and the secondary second lower arm /V2, such that the secondary conversion circuit 30 is caused to function as the step-down circuit and the secondary conversion circuit 30 is caused to function as part of the DC-DC converter circuit.

As described above, it is possible to cause each of the primary conversion circuit 20 and the secondary conversion circuit 30 to function as the step-up circuit or the step-down circuit, and it is possible to cause the electric power conversion circuit 10 to also function as the bidirectional DC-DC converter circuit. Thus, it is possible to convert electric power in all of the electric power conversion modes A to L, in other words, it is possible to convert electric power between the two input/output ports selected from among the four input/output ports.

The above control is executed over both the power supply circuit 11 and the power supply circuit 12. That is, the control circuit 50 changes the duty ratio and phase difference φ of at least one of the power supply circuits 11, 12 such that the output values Do of the first to fourth input/output ports PA, PC, PB, PD, detected by the sensor circuit 70, respectively follow the corresponding output target values Dot.

Figure 8:
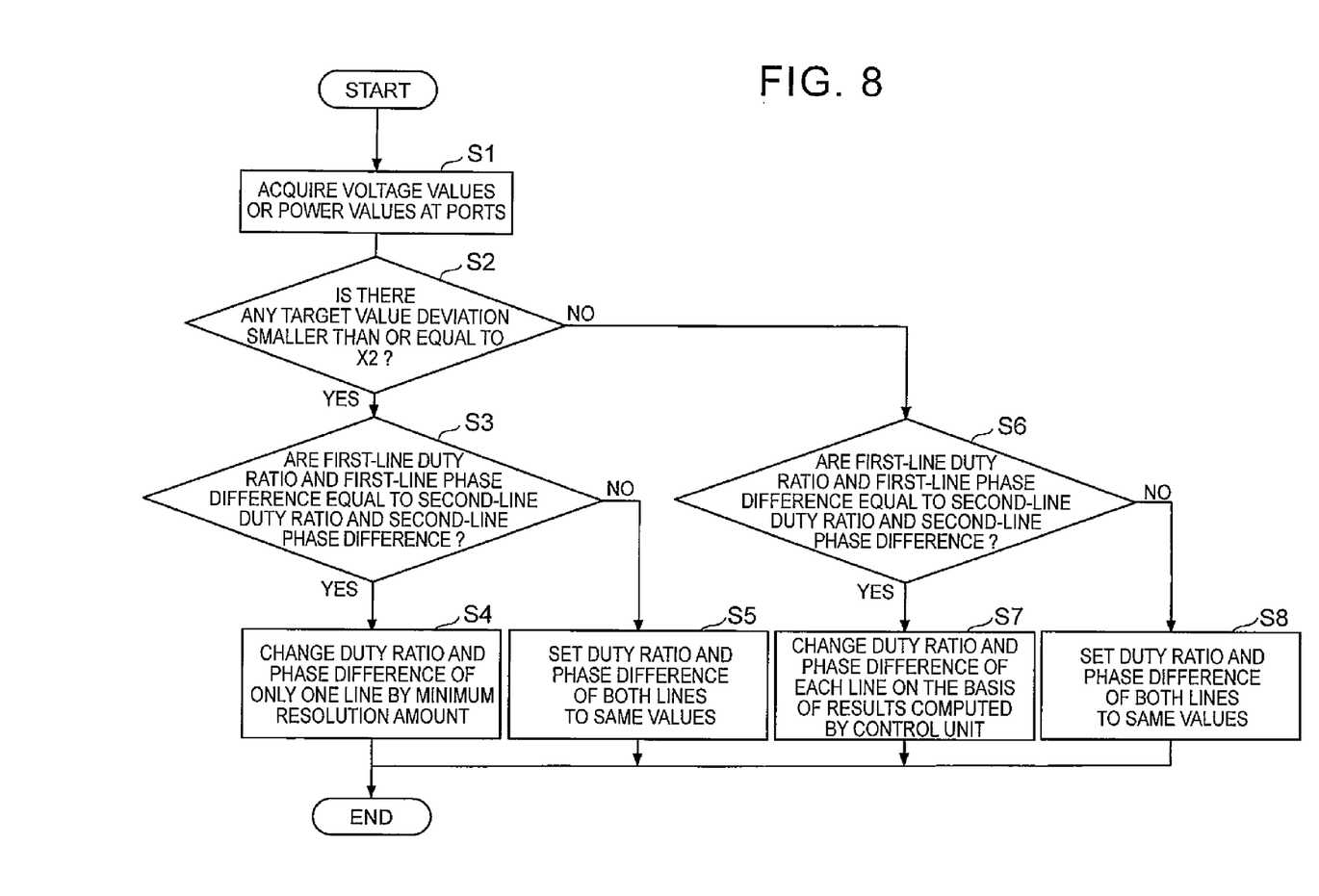
FIG. 8 is a flowchart that shows an example of a control method for the power supply system according to the second embodiment.
Figure 9:
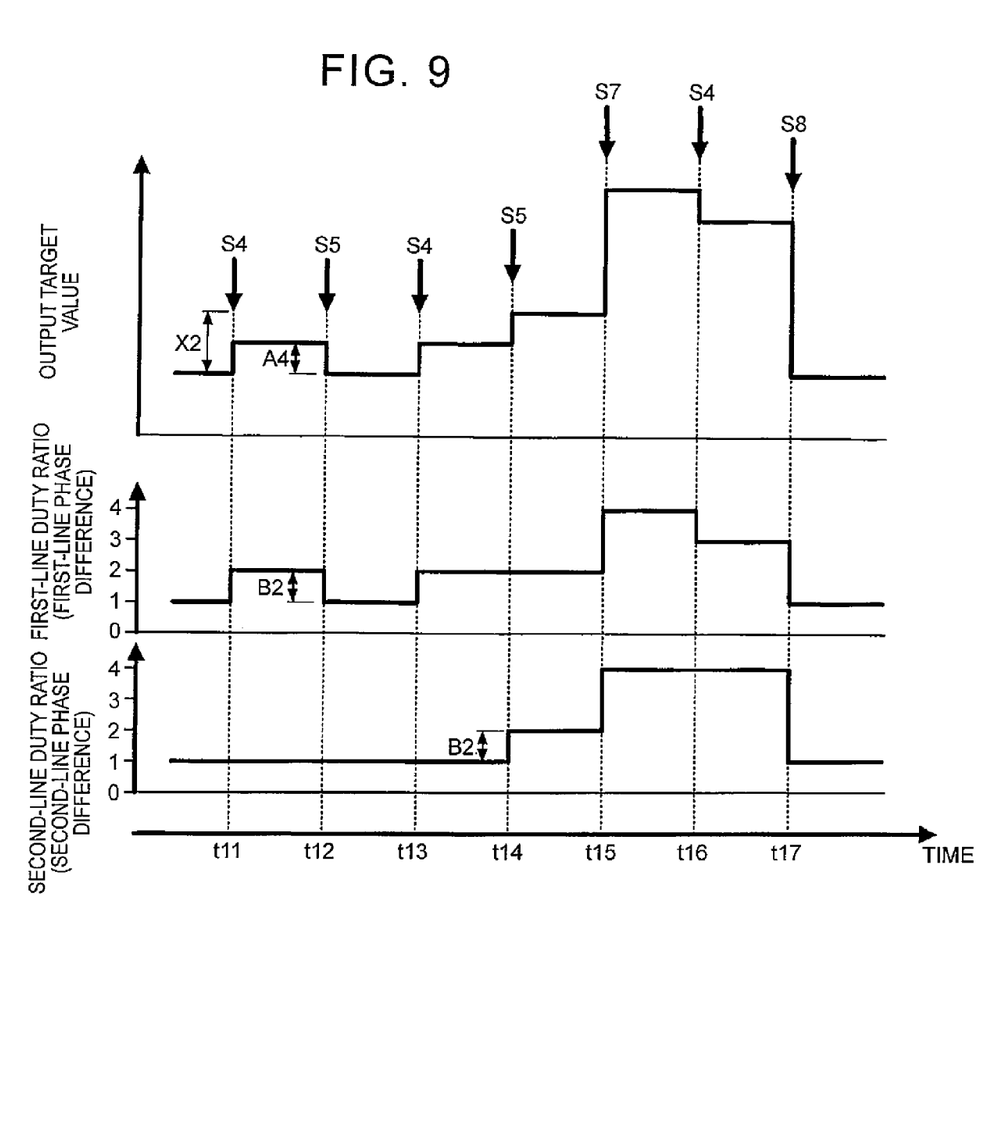
FIG. 9 is a timing chart that shows the example of the control method for the power supply system according to the second embodiment.

FIG. 8 is an example of a flowchart of a control method that is executed by the control circuit 50. FIG. 9 is a timing chart according to the control method shown in FIG. 8. The control method will be described with reference to FIG. 8 and FIG. 9.

In FIG. 8 and FIG. 9, a predetermined value X2 should be, for example, set to a minimum variation amount of each of the output values Do at the time when all the outputs of the plurality of power supply circuits are changed at the same time. Specifically, the predetermined value X2 should be set to a variation amount of each of the output values Do at the time when the phase difference δ or the duty ratio is changed in the power supply circuits 11, 12 by the minimum control resolution amount of each of the outputs of the power supply circuits 11, 12 at the same time. By setting the predetermined value X2 in this way, it is possible to cause the output values Do to further highly accurately follow the corresponding output target values Dot.

In addition, in FIG. 9, a variation amount B2 is a minimum span of adjustable range of the duty ratio or phase difference φ of each of the power supply circuits 11, 12. When the duty ratio or phase difference φ is changed by the variation amount B2, it is possible to change the output value of each of the power supply circuits 11, 12 by a minimum span of variation range. A variation amount A4 is a variation amount of each of the output target values Dot. In addition, numbers, such as S4, in FIG. 9 correspond to the step numbers of the flowchart in FIG. 8.

In step S1 of FIG. 8, the sensor circuit 70 acquires the voltage values or power values of the first to fourth input/output ports PA, PC, PB, PD.

In step S2, the control circuit 50 determines whether there is a deviation over the predetermined value X2 (>0) between any fluctuated one of the output target values Dot of the first to fourth input/output ports PA, PC, PB, PD and the output value Do corresponding to the fluctuated output target value Dot. Through this determination, it is determined whether to change the outputs of both the power supply circuits 11, 12 or the outputs of only one of the power supply circuits 11, 12. When it is determined that there is the deviation smaller than or equal to the predetermined value X2, the control circuit 50 executes the process of step S3; whereas, when it is determined that there is the deviation over the predetermined value X2, the control circuit 50 executes the process of step S6.

When it is determined in step S2 that there is the deviation smaller than or equal to the predetermined value X2, the control circuit 50 determines whether both the duty ratio and the phase difference $\phi$ of the first-line power supply circuit 11 and both the duty ratio and the phase difference $\phi$ of the second-line power supply circuit 12 are set to the same values (step S3). In step S3, the duty ratio and phase difference $\phi$ of the respective power supply circuits 11, 12 are compared with each other in order not to cause an excessive deviation between the output values of the power supply circuit 11 and the output values of the power supply circuit 12. The fact that both the duty ratio and the phase difference $\phi$ are the same means that both output values of the power supply circuits 11, 12 are set such that the difference is zero.

When it is determined in step S3 that both the duty ratio and the phase difference $\phi$ of the power supply circuit 11 are equal to both the duty ratio and the phase difference $\phi$ of the power supply circuit 12, the control circuit 50 processes step S4. In step S4, the control circuit 50 changes the duty ratio and phase difference $\phi$ of only one of the power supply circuits 11, 12 by the minimum resolution amount such that the corresponding output value Do approaches the output target value Dot fluctuated by a variation amount smaller than the predetermined value X2 (see timings t11, t13, t16 in FIG. 9).

When it is determined in step S3 that both the duty ratio and the phase difference $\phi$ of the power supply circuit 11 differ from both the duty ratio and the phase difference $\phi$ of the power supply circuit 12, the control circuit 50 processes step S5. In step S5, the control circuit 50 sets the duty ratio and the phase difference $\phi$ of the power supply circuits 11, 12 to the same values such that the corresponding output value Do approaches the output target value Dot fluctuated by a variation amount smaller than the predetermined value X2 (see timings t12, t14 in FIG. 9).

On the other hand, when it is determined in step S2 that there is the deviation over the predetermined value X2, the control circuit 50 determines whether both the duty ratio and the phase difference $\phi$ of the first-line power supply circuit 11 and both the duty ratio and the phase difference $\phi$ of the second-line power supply circuit 12 are set to the same values (step S6). In step S6, the duty ratio and phase difference $\phi$ of the respective power supply circuits 11, 12 are compared with each other in order not to cause an excessive deviation between the output values of the power supply circuit 11 and the output values of the power supply circuit 12. The fact that both the duty ratio and the phase difference $\phi$ are the same means that both output values of the power supply circuits 11, 12 are set such that the difference is zero.

When it is determined in step S6 that both the duty ratio and the phase difference $\phi$ of the power supply circuit 11 are equal to both the duty ratio and the phase difference $\phi$ of the power supply circuit 12, the control circuit 50 processes step S7. In step S7, the control circuit 50 changes the duty ratio and phase difference $\phi$ of each of the power supply circuits 11, 12 on the basis of the detected values detected by the sensor circuit 70 and the output target value Dot such that the corresponding output value Do approaches the output target value Dot fluctuated by a variation amount larger than the predetermined value (see timing t15 in FIG. 9).

When it is determined in step S6 that both the duty ratio and the phase difference $\phi$ of the power supply circuit 11 differ from both the duty ratio and the phase difference $\phi$ of the power supply circuit 12, the control circuit 50 processes step S8. In step S8, the control circuit 50 sets the duty ratio and the phase difference $\phi$ of the power supply circuits 11, 12 to the same values such that the corresponding output value Do approaches the output target value Dot fluctuated by a variation amount larger than the predetermined value X2 (see timing t17 in FIG. 9).

The power supply circuit and the control method for the power supply circuit are described by way of the embodiments; however, the invention is not limited to the above-described embodiments. The scope of the invention encompasses various modifications and improvements, such as combinations and replacements of the above-described embodiments with part or all of another embodiment.

For example, in the above-described embodiments, the MOSFET that is a semiconductor element that carries out on/off operation is described as an example of each switching element. However, each switching element may be, for example, a voltage-controlled power element with an insulated gate, such as an IGBT and a MOSFET, or may be a bipolar transistor.

In addition, when the step-up/step-down ratios of the primary side and secondary side are changed to different values, the duty ratios of the primary side and secondary side may be varied by varying the primary switching period T and the secondary switching period T from each other (see FIG. 7).

In addition, a power supply may be connected to the first input/output port PA or a power supply may be connected to the fourth input/output port PD. In addition, a power supply may not be connected to the second input/output port PC or a power supply may not be connected to the third input/output port PB.

What is claimed is:

1. A power supply system comprising:
   a plurality of power supply circuits connected to a common output node, each of the plurality of power supply circuits being a direct current (DC) to DC converter and comprising a transformer, a primary full-bridge switching circuit and a secondary full-bridge switching circuit; and
   a control unit configured to change a phase difference between switching timing of the primary full-bridge switching circuit and switching timing of the secondary full-bridge switching circuit, of each of the plurality of power supply circuits such that an output value at the output node follows an output target value at the output node, wherein
   the control unit is further configured to change the phase difference of part of the plurality of power supply circuits such that the output value approaches the output target value when a deviation between the output value and the output target value is less than or equal to a predetermined value and the phase difference of each of the plurality of power supply circuits has a same value.

2. The power supply system according to claim 1, wherein the control unit is further configured to change the phase difference of the part of the power supply circuits such that the output value approaches the output target value when the output target value has changed in a direction opposite to a direction in which the phase difference of the part of the power supply circuits has changed.

3. The power supply system according to claim 2, wherein the control unit is further configured to set the phase differences of the plurality of power supply circuits such that an output difference between an output of the remaining power supply circuits of the plurality of power supply circuits other than the part of the power supply circuits and an output of the part of the power supply circuits falls within a predetermined range when the output target value has changed in the direction opposite to the direction in which the phase difference of the part of the power supply circuits has changed.

4. The power supply system according to claim 1, wherein the control unit is further configured to change the phase difference of the remaining power supply circuits of the plurality of power supply circuits other than the part of the power supply circuits such that the output value approaches the output target value when the output target value has changed in a same direction as a direction in which the phase difference of the part of the power supply circuits has changed.

5. The power supply system according to claim 4, wherein the control unit is further configured to set the phase differences of the plurality of power supply circuits such that an output difference between an output of the remaining power supply circuits of the plurality of power supply circuits other than the part of the power supply circuits and an output of the part of the power supply circuits falls within a predetermined range when the output target value has changed in the same direction as the direction in which the phase difference of the part of the power supply circuits has changed.

6. The power supply system according to claim 1, wherein the control unit is further configured to change the phase difference of all the plurality of power supply circuits such that the output value approaches the output target value when the deviation between the output value and the output target value is greater than the predetermined value.

7. The power supply system according to claim 1, wherein the predetermined value is a minimum variation amount of the output value that is adjustable at the output node when the phase differences of all the plurality of power supply circuits are changed at the same time.

8. The power supply system according to claim 1, wherein the secondary full-bridge switching circuit is magnetically coupled to the primary full-bridge switching circuit via the transformer,
each of the plurality of power supply circuits comprises four ports that correspond to a first port and a second port of the primary full-bridge switching circuit and a third port and a fourth port of the secondary full-bridge switching circuit, and
each of the plurality of power supply circuits is configured to convert electric power between any two of the four ports.

9. The power supply system according to claim 1, wherein the control unit is further configured to set the phase difference of the plurality of power supply circuits to have a same value such that the output value approaches the output target value when the deviation between the output value and the output target value is greater than the predetermined value and the phase difference of each of the plurality of power supply circuits has a different value.

10. A control method for controlling a plurality of power supply circuits connected to a common output node, each of the plurality of power supply circuits being a direct current (DC) to DC converter and including a transformer, a primary full-bridge switching circuit and a secondary full-bridge switching circuit, the method comprising:
changing a phase difference between switching timing of the primary full-bridge switching circuit and switching timing of the secondary full-bridge switching circuit of each of the plurality of power supply circuits such that an output value at the output node follows an output target value at the output node,
wherein changing the phase difference comprises
changing the phase difference of part of the plurality of power supply circuits such that the output value approaches the output target value when a deviation between the output value and the output target value is less than or equal to a predetermined value and the phase difference of each of the plurality of power supply circuits has a same value.

11. A power supply system comprising:
a plurality of power supply circuits connected to a common output node, each of the plurality of power supply circuits being a direct current (DC) to DC converter and having a transformer, a primary full-bridge switching circuit and a secondary full-bridge switching circuit; and
a control unit configured to change a duty ratio between switching timing of the primary full-bridge switching circuit and switching timing of the secondary full-bridge switching circuit, of each of the plurality of power supply circuits such that an output value at the output node follows an output target value at the output node, wherein
the control unit is further configured to change the duty ratio of part of the plurality of power supply circuits such that the output value approaches the output target value when a deviation between the output value and the output target value is less than or equal to a predetermined value and the duty ratio of each of the plurality of power supply circuits has a same value.

12. The power supply system according to claim 11, wherein the control unit is further configured to change the duty ratio of the plurality of power supply circuits such that the output value approaches the output target value when the deviation between the output value and the output target value is greater than the predetermined value.

13. The power supply system according to claim 11, wherein the control unit is further configured to set the duty ratio of the plurality of power supply circuits to have a same value such that the output value approaches the output target value when the deviation between the output value and the output target value is greater than the predetermined value and the phase difference of each of the plurality of power supply circuits has a different value.

14. The power supply system according to claim 11, further comprising:
a control unit configured to change a phase difference between switching timing of the primary full-bridge switching circuit and switching timing of the secondary full-bridge switching circuit, of each of the plurality of power supply circuits such that an output value at the output node follows an output target value at the output node,
wherein the control unit is further configured to change the phase difference and the duty cycle of part of the plurality of power supply circuits such that the output value approaches the output target value when a deviation between the output value and the output target value is less than or equal to a predetermined value, the duty ratio of each of the plurality of power supply circuits has a same value, and the phase difference of each of the plurality of power supply circuits has a same value.

* * * * *